(12) United States Patent
Braunbeck et al.

(10) Patent No.: US 12,463,481 B2
(45) Date of Patent: Nov. 4, 2025

(54) ROTOR OF AN ELECTRIC MOTOR HAVING A COOLING DEVICE AND A METHOD FOR MANUFACTURING A ROTOR OF AN ELECTRIC MOTOR HAVING A COOLING DEVICE

(71) Applicant: Dr. Ing. h.c. F. Porsche Aktiengesellschaft, Stuttgart (DE)

(72) Inventors: Florian Braunbeck, Bietigheim-Bissingen (DE); Tobias Engelhardt, Stuttgart (DE); Patrick Knecht, Stuttgart (DE); Johannes Lange, Dettenheim (DE); Peter Wurster, Wiggensbach (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 280 days.

(21) Appl. No.: 18/138,326

(22) Filed: Apr. 24, 2023

(65) Prior Publication Data

US 2023/0421009 A1    Dec. 28, 2023

(30) Foreign Application Priority Data

Jun. 28, 2022   (DE) ..................... 10 2022 116 061.0

(51) Int. Cl.
*H02K 1/32*   (2006.01)
(52) U.S. Cl.
CPC ...................... *H02K 1/32* (2013.01)
(58) Field of Classification Search
CPC .................... H02K 1/32; H02K 3/24
See application file for complete search history.

(56) References Cited

U.S. PATENT DOCUMENTS

| 1,448,700 A | * | 3/1923 | Seidner | H02K 9/00 |
| | | | | 310/64 |
| 3,995,180 A | * | 11/1976 | Giles | H02K 3/24 |
| | | | | 310/55 |

(Continued)

FOREIGN PATENT DOCUMENTS

| DE | 19749108 | 4/1999 |
| DE | 102014220510 | 4/2016 |

(Continued)

OTHER PUBLICATIONS

DE-102019130342-A1, all pages (Year: 2021).*

(Continued)

*Primary Examiner* — Naishadh N Desai
(74) *Attorney, Agent, or Firm* — Gerald E. Hespos; Michael J. Porco

(57) ABSTRACT

A rotor (1) of an electric motor (20) has a rotor body (21) with a rotor shaft receptacle opening (22) for receiving a rotor shaft (3), and a rotor sheath (23) is on the rotor body (21) outward of the rotor shaft receptacle opening (22). Magnetic field-inducing components (10) are arranged in the rotor body (21). The rotor body (21) further has first and second end faces (14, 18) facing away from one another. The rotor (1) also includes a cooling device (4) with a supply channel (5), a drainage channel (6) and cooling channels (11) formed in the rotor body (21) between the rotor shaft receptacle opening (22) and the rotor sheath (23). The cooling channels (11) are arranged adjacent to the magnetic field-inducing components (10). A method for manufacturing a rotor having a cooling device also is provided.

10 Claims, 1 Drawing Sheet

(56) References Cited

U.S. PATENT DOCUMENTS 4,228,374 A  *  10/1980  Elsel ..................... H02K 55/04
                                                    310/64
10,985,624 B2 *  4/2021  Berendes ................. H02K 7/04

FOREIGN PATENT DOCUMENTS

| DE | 102016215428 A1 * | 2/2018 | ............. H02K 9/197 |
| DE | 102017010383 A1 | 5/2018 | |
| DE | 102019124345 | 3/2020 | |
| DE | 102018222634 | 6/2020 | |
| DE | 102019130342 A1 * | 5/2021 | |
| DE | 102021133104 A1 * | 10/2022 | .............. H02K 3/50 |
| EP | 3637661 | 3/2020 | |

OTHER PUBLICATIONS

DE-102021133104-A1, all pages (Year: 2021).*
DE-102016215428-A1, all pages (Year: 2018).*
Examination Reported dated Jul. 17, 2023.

* cited by examiner

ROTOR OF AN ELECTRIC MOTOR HAVING A COOLING DEVICE AND A METHOD FOR MANUFACTURING A ROTOR OF AN ELECTRIC MOTOR HAVING A COOLING DEVICE

CROSS-REFERENCE TO RELATED APPLICATION

This application claims priority on German Patent Application No. 10 2022 116 061.0 filed Jun. 28, 2022, the entire disclosure of which is incorporated herein by reference.

BACKGROUND

Field of the Invention. The invention relates to a rotor of an electric motor having a cooling device and to a method for manufacturing a rotor of an electric motor having a cooling device.

Related Art. Electric motors comprise a stator and a rotor that is rotatable relative to the stator. The electric machine must be cooled so that heat generated in the stator and/or rotor and/or windings of the electric machine can be dissipated to ensure a safe and trouble-free operation of the electric motor. Thus, the stator and/or rotor typically are configured with a central cooling channel to be perfused by a cooling medium.

DE 10 2019 124 345 A1 discloses an electric motor with a stator that has a current conductor in the form of conductor rods formed between packages of sheet metal. The conductor rods comprise internal and external cooling channels.

U.S. Pat. No. 4,228,374 discloses an electric motor with a rotor having rotor body that includes a mixing chamber in which a gaseous cooling medium and a liquid coolant are mixed. The mixture is supplied to a superconductive winding of the electric motor that is infiltrated with axially extending cooling channels that can be perfused by the mixture.

DE 197 49 108 C1 discloses a stator of an electric machine having a cooling channel extending axially through the rotor.

EP 3 627 661 A1 discloses a cage rotor of an electric machine having a cooling channel extending axially through the rotor.

An object of the invention is to provide a rotor of an electric motor having a cooling device that provides more efficient cooling than the prior art and to provide a method for manufacturing a rotor of an electric motor having a cooling device.

SUMMARY OF THE INVENTION

An electric motor according to the invention has a rotor with magnetic field-inducing components arranged in a rotor body of the rotor. The rotor body has a first end face and a second end face that faces away from the first end face. The rotor has a rotor shaft arranged in a rotor shaft receptacle opening. The electric machine also has a cooling device with a supply channel, a drainage channel and cooling channels. The cooling channels are formed between the rotor shaft receptacle opening and a rotor sheath of the rotor in the rotor body. Additionally, the cooling channels are arranged adjacent to the magnetic field-inducing components. More particularly, the cooling channels can be arranged in the immediate vicinity of the magnetic field-inducing components so that an effective cooling can take place. The magnetic field-inducing components are permanent magnets, and a cooling channel is arranged between two adjacent permanent magnets. The magnetic field-inducing components also can be windings, and a cooling channel can be between two windings. Typically, the magnetic field-inducing components are arranged in a circular array in a cross-section of the rotor so that a number of passage openings to be provided in the corresponding cutting plane corresponds to a number of the magnetic field-inducing components. The magnetic field-inducing components may be windings that are not penetrated by the cooling channels, but rather the cooling channels can be arranged adjacent to the windings.

The cooling device of some embodiments has a manifold formed on the first end face of the rotor and connected to the cooling channels in a perfusable manner. Thus, a connection of the supply channel to the cooling channels can be created easily so that the cooling channels are perfused by coolant.

The drainage channel may be disposed in the rotor shaft, and thus centrally with respect to the rotor. In particular, the drainage channel can be connected perfusably to the cooling channels by means of a further annular channel that can be on the second end face. As a result, an efficient cooling can be ensured due to an effective perfusion of the cooling channels, because the coolant can flow in one end of the cooling channels and out the other end of the cooling channels.

The invention also relates to method for manufacturing a rotor of an electric motor having a cooling device. The rotor is configured to be rotatable relative to a stator of the electric motor about an axis of rotation corresponding to a longitudinal axis of the rotor. The cooling device has a cooling channel that is kept free with the aid of a tool and a tool core. The cooling channel is formed between a rotor shaft receptacle opening of the rotor and a rotor sheath of the rotor. Thus, the rotor can be manufactured in an inexpensive manner by having the cooling channel formed in the rotor body of the rotor by a reshaping process, such as a punching process.

The rotor may have individual blades joined and glued together by pressing. In this operation, a passage opening, which forms an axial portion of the cooling channel in the individual blade, can already be wrapped by a plastic compound during the joining process so that openings arranged axially side-by-side form a dense cooling channel.

Further advantages, features and details of the invention will be apparent from the following description with the aid of the drawings. The features and feature combinations specified in the foregoing description, as well as the features and feature combinations specified hereinafter in the description of the drawings and/or shown alone in the drawings, are able to be used in the respectively indicated combination and also in other combinations, or on their own, without departing from the scope of the invention.

DETAILED DESCRIPTION

Figure 1:
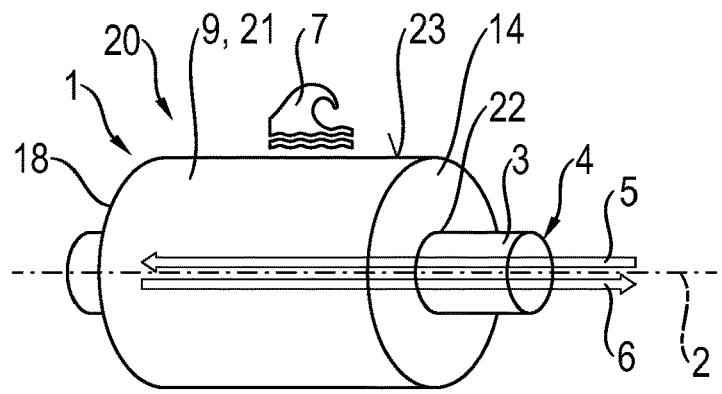
FIG. 1 is a schematic diagram of a prior art rotor with a cooling system.

FIG. 1 is a schematic illustration of a rotor 1 of an electric motor 20 having a cooling system according to the prior art. The rotor 1 is a hollow cylinder with a rotor shaft 3 extending along its longitudinal axis 2, which is also its rotational axis. The rotor shaft 3 is arranged in a rotor shaft receptacle opening 22 of the rotor 1 and has a cooling device 4 comprising a supply channel 5 and a drainage channel 6. The cooling device 4 is configured as a central cooling system that can be perfused by coolant. Typically, the coolant is a cooling oil, but is not limited thereto. The supply channel 5 and the drainage channel 6 are parallel to one another. The coolant is supplied to the rotor 1 via the supply channel 5, and the heated coolant is removed from the rotor 1 via the drain passage 6.

Another form of the cooling device 4 has an external cooling system that is depicted symbolically by the numeral 7, and can be used alone or with the central cooling system for cooling the rotor 1, which can have temperatures well above 150° C.

Figure 2:
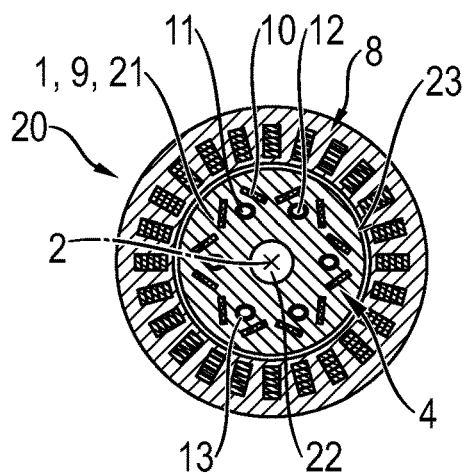
FIG. 2 is a cross-section of a rotor according to the invention with a stator comprising the rotor with permanent magnets, manufactured by a method according to the invention.
Figure 3:
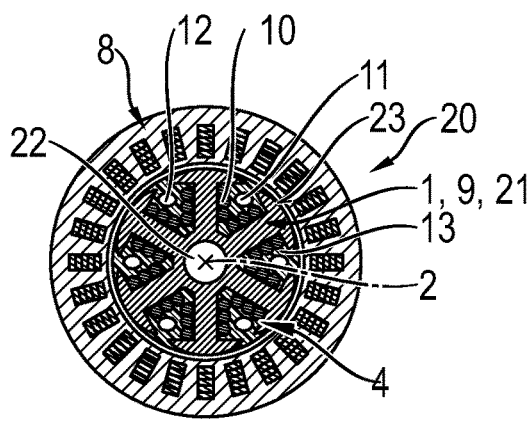
FIG. 3 is a cross-section showing the rotor and a stator where the rotor has a winding manufactured by the method of the invention.

A rotor 1 according to an embodiment of the invention is used with a stator 8, as illustrated in FIGS. 2 and 3. The rotor 1 is formed from individual blades 9 arranged on a rotor shaft 3. The thickness of the individual blades 9 is approximately 0.2 mm. In FIG. 2, the rotor is depicted in the form of a so-called "PSM" rotor, and has magnetic field-inducing components 10 in the form of permanent magnets. The permanent magnets 10 are inserted in pockets of the individual blades 9.

FIG. 3 depicts a rotor 1 in the form of a so-called "FSM" rotor and has the magnetic field-inducing components 10 in the form of windings, usually in the form of copper wire windings. A magnetic field can be formed when a voltage is applied. The magnetic field can be induced on the rotor 1 or on the stator 8.

The rotor 1 comprises a cooling device 4 to realize effective cooling of the rotor 1. The cooling device 4 has multiple cooling channels 11 arranged in the immediate vicinity of the permanent magnets 10 or the windings 10, depending on the construction of the rotor 1. The cooling channels 11 are not in the rotor shaft 3, but rather are directly in the rotor 1 itself. Thus, the cooling channels 11 are adjacent to the permanent magnets 10 or the windings 10 but do not penetrate them. More particularly, the cooling device 4 has the cooling channels 11 formed between the rotor axis receptacle opening 22 of the rotor 1 and a rotor sheath 23 of the rotor 1 in the rotor body 21 itself. Therefore, the cooling channels 11 are arranged adjacent to and between the magnetic field-inducing components 10.

The individual blades 9 of the rotor 1 are produced in their manufacturing process with passage openings 12 that completely penetrate the individual blades 9, and the passage openings 12 form portions of the cooling channels 11 when the blades 9 are assembled to form the rotor 1. The rotor 1 is in the shape of a hollow cylinder, and the individual blades 9 are joined in a joining step of the method by being pressed together and/or glued together to be arranged side-by-side in the axial direction so that the axially aligned passage openings 12 form an individual cooling channel 11. A sealing material 13, such as a plastic, can be used to surround the adjacently arranged passage openings 12 to achieve a safe configuration of the cooling channel 11. The method of applying the sealing material depends on the manufacturing process of the rotor 1. For example, the plastic can be applied as a "mold mass" that is configured to surround the passage openings 12 during the pressing of the individual blades 9.

Figure 4:
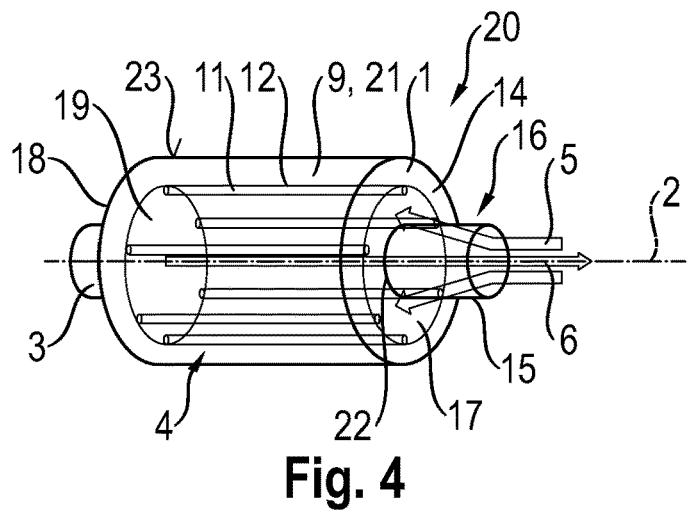
FIG. 4 in a schematic illustration of the rotor of the invention having multiple cooling channels.

FIG. 4 is a schematic perspective view of a rotor 1 with multiple cooling channels 11. The rotor 1 has a first end face 14 with a manifold head 15 that is cast or "molded" in a reshaping process that manufactures the rotor 1. The manifold head 15 forms part of a manifold portion 16 of the cooling device 4.

The manifold portion 16 has the inlet or supply channel 5 that opens up into a first annular channel 17 in the manifold portion 16 of the rotor 1. The first annular channel 17 is connected to the cooling channels 11 in a perfusable manner. Coolant is conveyed in a pressurized state into the inlet channel 5.

The rotor 1 further has a second end face 18 with a second annular channel 19 that is connected perfusably to the drainage channel 6 formed in the rotor shaft 3, via which the coolant flows to the first end face 14 and exits at the manifold head 15.

In an alternate embodiment, the drainage channel 6 is on the second end face 18 to avoid a direction reversal of the coolant.

The rotor 1 is manufactured by a method that includes a first step of introducing the passage openings 12 into the individual blades 9 during production of the individual blades 9. The step may use a tool having a number of tool cores corresponding to the number of passage openings 12. The method may include a further step of joining the individual blades 9 to a rotor body 21 of the rotor 1. The magnetic field-inducing components 10 in the form of permanent magnets or windings are introduced after or before the joining step. In principle, there already is a sufficient sealing between the passage holes 12 after the joining of the individual blades 9, so that the cooling channels 11 can be perfused safely by the cooling medium. However, an additionally secure sealing can be achieved with a seal in the form of a plastic that is formed to surround the passage openings 12. In some methods, this plastic is called "mold mass".

The manifold portion 16 of the cooling device 4 can also be formed from a plastic. The manifold head 15 can also be manufactured in a reshaping process using the manifold portion 16 in a casting process or molding process.

The invention claimed is:

1. A method for manufacturing a rotor (1) of an electric motor (20), the rotor (1) having a rotor shaft receptacle opening (22) configured to receive a stator (8) of the electric motor (20) so that the rotor (1) is rotatable relative to the stator (8) about an axis of rotation corresponding to a longitudinal axis (2) of the rotor (1), the rotor (1) further having a rotor sheath (23) outward of the rotor shaft receptacle opening (22), and a cooling device (4) having cooling channels (11) formed between the rotor shaft receptacle opening (22) and the rotor sheath (23) of the rotor (1), the method comprising:

using a tool for forming individual blades (9) that have pockets for receiving permanent magnets, the tool having tool cores for forming passage openings (12) in the individual blades (9) during production of the individual blades (9) with each of the passage openings (12) being between two of the pockets for receiving the permanent magnets;

joining the individual blades (9) side-by-side along the longitudinal axis (2) of the rotor (1) so that the respective passage openings (12) of the blades (9) align to form the cooling channels (11) of the cooling device (4); and applying a plastic sealing to surround the passage openings (12) that form the cooling channels (11).

2. The method of claim 1, further comprising introducing a plurality of permanent magnets into the pockets.

3. A rotor (1) of an electric motor (20), comprising:
a rotor shaft (3);
a rotor body (21) having a rotor shaft receptacle opening (22) in which the rotor shaft (3) is mounted, a rotor sheath (23) surrounding the rotor body (21) outward of the rotor shaft opening (22), and first and second end faces (14, 18) facing away from one another at opposite ends of the rotor body (21), the rotor body (21) being formed from blades (9) arranged on the rotor shaft (3) side-by-side in an axial direction of the rotor shaft (3);
magnetic field-inducing components (10) arranged in the rotor body (21) between the rotor shaft receptacle opening (22) and the rotor sheath (23); and
a cooling device (4) that comprises a supply channel (5), a drainage channel (6) and cooling channels (11) formed in the rotor body (21) between the rotor shaft receptacle opening (22) and the rotor sheath (23) at positions adjacent the magnetic field-inducing components (10), the cooling channels (11) being formed by passage openings (12) that penetrate the blades (9), the passage openings (12) of the blades (9) being aligned and being sealed by a plastic sealing material to form the cooling channels (11) that extend parallel to the axial direction of the rotor shaft (3).

4. The rotor (1) of claim 3, wherein the cooling channels (11) are arranged between the magnetic field-inducing components (10).

5. The rotor (1) of claim 3, wherein the cooling device (4) further comprises a manifold portion (16) formed on the first end face (14) of the rotor (1) and connected to the cooling channels (11) in a perfusable manner.

6. The rotor (1) of claim 3, wherein the drainage channel (6) is formed in the rotor shaft (3).

7. The rotor (1) of claim 3, wherein the drainage channel (6) is perfusably connected to the cooling channels (11) by a further annular channel (19).

8. The rotor (1) of claim 7, wherein the further annular channel (19) is on the second end face (18).

9. The rotor (1) of claim 3, wherein the magnetic field-inducing components (10) are permanent magnets.

10. The rotor (1) of claim 3, wherein the magnetic field-inducing components (10) are windings.

\* \* \* \* \*